Feb. 24, 1931.  A. E. KRICK  1,793,809
LIQUID SUPPLY DEVICE
Filed Oct. 14, 1927
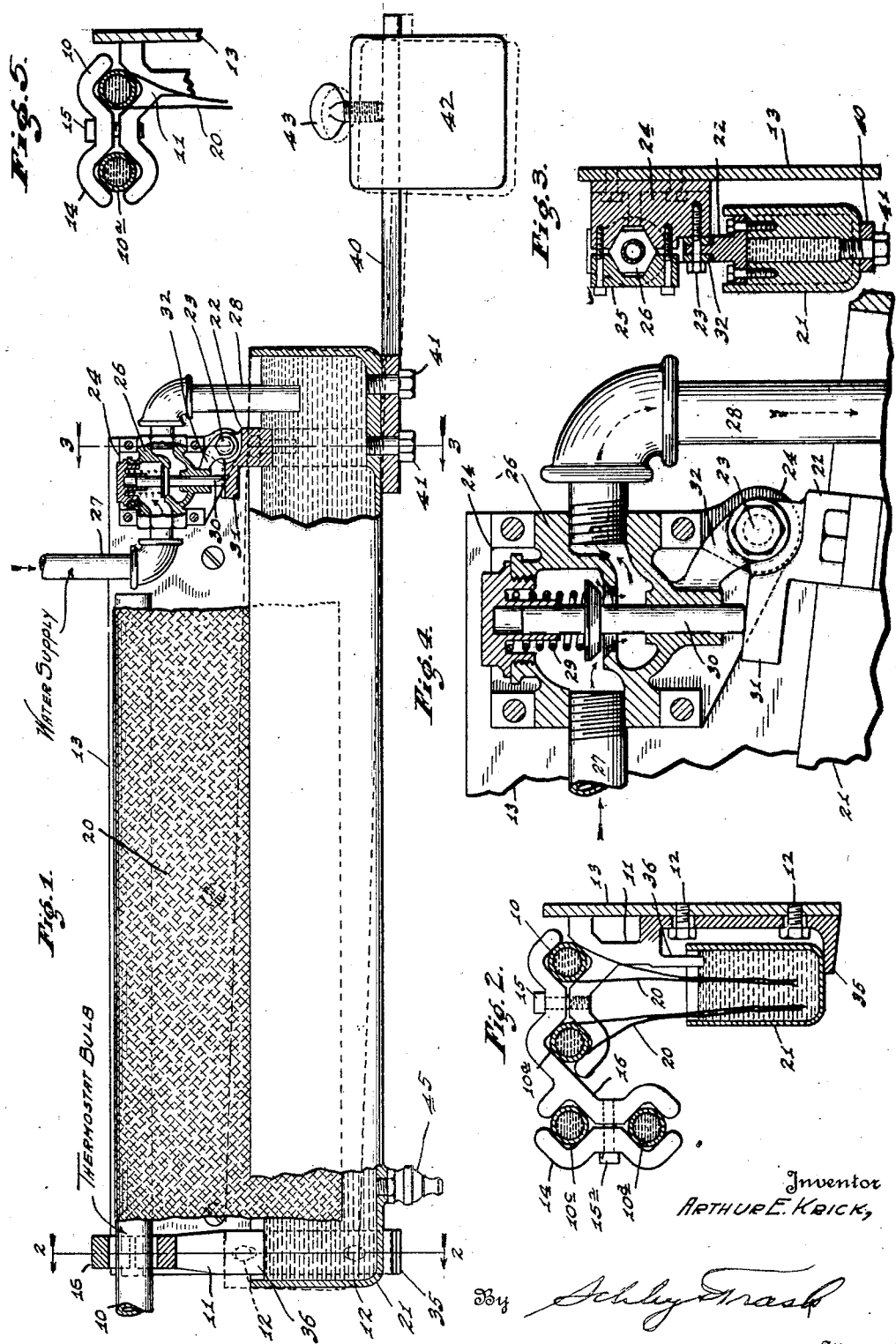
Inventor
ARTHUR E. KRICK,
By Ashley Trash
Attorney Patented Feb. 24, 1931

1,793,809

UNITED STATES PATENT OFFICE

ARTHUR E. KRICK, OF DANVILLE, INDIANA, ASSIGNOR TO THE NATIONAL DRY KILN COMPANY, OF INDIANAPOLIS, INDIANA, A CORPORATION OF INDIANA

LIQUID-SUPPLY DEVICE

Application filed October 14, 1927. Serial No. 226,226.

In many instruments for indicating and/or recording the relative humidity of the air, a temperature-responsive element, such as a thermostat bulb, is covered with a wick which dips in water and maintains such temperature-responsive element moist, so that the evaporation from the wick around such temperature-responsive element cools the latter to a temperature which is below the temperature of the air by an amount dependent upon the relative humidity of the air and the consequent rate of evaporation.

Considerable difficulty has been experienced in maintaining the wicks properly wet; for if they supply too little moisture to the temperature-responsive element the indication of wet-bulb temperature is too high, while if they supply too much moisture the temperature-responsive element tends to take the temperature of the moisture itself rather than the true wet-bulb temperature.

It is the object of my present invention to provide a simple construction for maintaining substantially uniform the water level in a pan, such as a pan in which the wick of a wet-bulb temperature-responsive element dips; so that the errors of the temperature-responsive element may be minimized, and so that any errors which may exist will be substantially constant errors rather than errors which fluctuate by chance.

In carrying out my invention, I provide a wick on the temperature-responsive element, such as the thermostat bulb, in any convenient way; and arrange such wick so that it dips into water in a tank which is movable slightly up and down as the weight of the water in it falls below and rises above a predetermined value; and I control the supply of water to said tank by the movements of the tank, so that when the weight of water therein decreases below the predetermined value the tank rises to admit more water, and subsequently falls and shuts off the water supply when the weight of water therein exceeds such predetermined value. In this way, a substantially constant water level may be maintained, within fairly close limits, and the moisture which the wick supplies to the temperature-responsive device may be maintained at the proper value. I prefer to make the water-controlling valve one which tends to open fairly wide when it once starts to open, instead of merely "cracking"; so that there will be a fairly prompt turning on and off of the water.

The accompanying drawing illustrates my invention: Fig. 1 is a vertical longitudinal view through a device embodying my invention, showing the tiltably mounted tank into which the wick on the bulb of a wet-bulb thermostat dips, and a valve controlling the water supply to the tank and in turn controlled by the tilting of the tank; Fig. 2 is a section on the line 2—2 of Fig. 1, showing the bulb-supporting device as used for supporting the bulbs of two pairs of thermostats; Fig. 3 is a section on the line 3—3 of Fig. 1; Fig. 4 is an enlarged detail of the upper right-hand corner of Fig. 1, showing the valve construction on a larger scale, and with the valve open instead of closed as in Fig. 1; and Fig. 5 is a view similar to Fig. 2, showing the bulb-supporting device as used for supporting the bulbs of one pair of thermostats.

The temperature-responsive devices to which my invention is applicable may be of any desired character, but is most conveniently an indicating or recording thermostat having a bulb which is maintained wet by a suitable wick. In the drawings, I have shown only the bulb 10 of such a thermostat, without showing as a whole the indicating or recording instrument of which such thermostat bulb forms part, since such recording or indicating instrument may be of so many different types. Usually the wet-bulb thermostat is one of a pair of thermostats, one wet-bulb and one dry-bulb; and sometimes it is desirable to provide two pairs of thermostats, each having one wet-bulb thermostat and one dry-bulb thermostat, for different indicating or recording or controlling operations.

In order to provide for the different arrangements of thermostat bulbs, I provide a main bracket 11 which is attached, as by screws 12, to a supporting plate or wall 13, the bracket 11 being vertically adjustable on such wall by having vertically extending slots for such screws 12. The bracket 11 has an outwardly extending arm at the top, containing a pair of notches for receiving two thermostat bulbs 10 and 10ª and adapted to support such bulbs in horizontal position. If only two such bulbs are used, the bulb 10 would be a wet-bulb thermostat, and the bulb 10ª a dry-bulb thermostat; in which case they would be clamped in their notches in the horizontal arm of the bracket 11, by a correspondingly notched clamping bar 14 which overlies the two thermostat bulbs and is attached to said bracket arm by a central attaching screw 15, as is shown in Fig. 5. If there are two pairs of thermostats, the thermostat bulbs 10 and 10ª would both be wet-bulbs, each with its wick; and there would then be two dry-bulb thermostats having bulbs 10ᶜ and 10ᵈ, as indicated in Fig. 2. When these two pairs of thermostats are used, the clamping plate 14 is not attached to the horizontal arm of the bracket 11, but instead there is a member 16 which has a double notched horizontal portion and a double notched vertical portion, the former taking the place of the clamping plate 14 in Fig. 5 and being attached to the horizontal arm of the bracket 11 by the screw 15 as shown in Fig. 2, and the latter being a supporting arm in which the two thermostat bulbs 10ᶜ and 10ᵈ are clamped by the clamping plate 14 and a second attaching screw 15ª. Thus the clamping plate 14 is used to co-operate directly with the horizontal arm of the bracket 11 when only one pair of thermostats is used, but to co-operate with the vertical arm of the member 16 if two pairs of thermostats are used.

The bulb of each wet-bulb thermostat, which is the bulb 10 in Figs. 1 and 5 and the bulbs 10 and 10ª in Fig. 2, is overlaid by a wick 20, in the usual manner of wet-bulb thermostats; and such wick, or each of such wicks, hangs down from the associated thermostat bulb into water in a relatively long narrow tank 21. The tank 21 is pivotally supported near one end, so that its other end may tilt up and down. As shown, such pivotal support is near the right-hand end in Fig. 1. It is provided by a member 22 which is suitably attached to the tank 21 and extends upward therefrom and is hung on a pivot pin 23. The pivot pin 23 is screwed into a supporting member 24 attached to the wall or plate 13; and this member 24 also has clamped to it a clamping plate 25 by which a suitable valve 26 may be clamped in place. The member 24 and clamping plate 25 are provided with complementary notches to receive the hexagonal end portions of the valve 26. Such valve is connected at its receiving end to a water-supply pipe 27, and at its discharge end to an outlet pipe 28 which extends downward into the tank 21 near its pivoted end.

The valve 26 is of the type known as a "whistle" valve. As mounted here, the valve proper is pressed to its seat by a spring 29, which is assisted in holding the valve member against its seat by the pressure of the water supply in the pipe 27. The valve stem 30 extends downward through the valve casing, and its lower end co-operates with an operating arm 31 beneath it. This operating arm is part of the member 22. In order to make certain that such co-operation is always the same even though the parts are taken apart and put back together again, there are ears 32 provided on the casing of the "whistle" valve 25, as is customary in such valves, and these ears also receive the pivot pin 23. This not only serves to position the parts properly, but also serves as an additional support for carrying the load of the tank 21 and the water therein.

The other or unpivoted end of the tank 21 is free to move up and down, as shown by the full-line and dotted-line positions in Fig. 1. Such vertical swinging is limited and guided, however, by a suitable finger 35 extending out from the bottom of the main bracket 11 below the tank 21, and by a guide finger 36 extending downward from an intermediate part of such bracket into the tank 21. The finger 36 guides the movement of the tank 21, and prevents such tank from being laterally displaced toward and from the wall 13; and the vertical movement of the left-hand end (Fig. 1) of the tank is limited to the play between the lower finger 35 and the horizontal under face of the bracket 11 at the upper end of the guide-arm 36.

The weight of the water in the tank 21 tends to move its left-hand end downward. To counterbalance this, I provide a weight-supporting arm 40 extending to the right (Fig. 1) from the pivoted end of the tank. This arm 40 is attached to the under side of the tank by screws 41, and carries a counterweight 42 which may be shifted to different positions along such arm and clamped in any desired position by a clamping screw 43.

If desired, the tank 21 may be provided with a drain cock 45.

In operation, the counterweight 42 is adjusted so that such counterweight overcomes the weight of the water in the tank and tilts the left-hand end of the tank upward when the level of such water falls below a predetermined height in the tank as a result of evaporation of such water. When this occurs, the arm 31 pushes the valve stem 30 upward, and lets water flow from the pipe 27 to the pipe 28 into the tank. This raises the level of the water in the tank, until the weight of such water overcomes the counterweight 42; whereupon the left-hand end of the tank 21 is tilted downward until stopped by the stop finger 35, and lets the valve stem 30 move downward by the spring 29 to shut off the supply of water to the tank. In this way, the water level in the tank may be kept between certain limits, automatically, and the limits may be sufficiently close together so that variation in the water level between such limits does not materially affect the supplying of water by the wicks 20 to the bulbs of the wet-bulb thermostats.

In this operation, when the water-controlling valve is closed, the water pressure assists the spring 29 in holding the valve member proper on its seat. As soon as the left-hand end of the tank starts upward, however, and starts to raise the valve-stem 30, which permits some water to pass through the valve; which relieves to some extent the unbalanced water-pressure on the top of the valve disk, and thus lets such valve move promptly to wide open position. Similarly, when the left-hand end of the tank 21 starts to tilt downward, and thus starts to lower the valve stem 30, the water pressure tends to build up on top of the valve disk, to assist the spring 29 in moving such valve promptly to its seat.

I claim as my invention:

1. In combination, a temperature-responsive element, a wick associated with such temperature-responsive element for maintaining it wet, a water-tank into which said wick dips, said tank being movable up and down relative to said wick and being provided with means tending to move it upward when the weight of the water in the tank falls below a predetermined value and to let it move downward when such weight of water exceeds a predetermined value, and a water-supplying pipe supplying said tank and provided with a valve, said valve being arranged to be controlled by said tank movements so that it opens when the tank tilts upward and closes when the tank tilts downward, said valve being arranged so that the pressure of the water tends to close it.

2. In combination, a tiltably mounted water-tank, a counterweight associated with said tank and arranged to tilt the tank upward when the weight of water therein falls below a predetermined value and to let the tank tilt downward when the weight of water therein exceeds a predetermined value, water-supplying means for supplying water to said tank and controlled by said tank movements, a stationary bracket for supporting said tank, said bracket being provided with means for supporting a thermostat bulb and with a stop limiting tank-movement, a wick overlying said thermostat bulb and dipping into the water in said tank, a clamping plate which may co-operate with said bracket to hold said thermostat bulb in place, and an intermediate member which may be used in place of said clamping plate to hold said thermostat bulb in place and may serve as a support for an additional thermostat bulb and to co-operate with the first-named clamping plate in holding said additional thermostat bulb.

3. In combination, a valve having a casing provided with inlet and outlet openings, a valve seat separating said openings, a valve member located on that side of said valve seat nearest said inlet opening and movable toward and away from said valve seat to close and open said valve, a tank adapted to receive liquid discharged from said outlet opening, said tank being movable up and down and being provided with means tending to move it upward when the weight of the water in the tank falls below a predetermined value and to let it move downward when such weight of water exceeds a predetermined value, and means operatively connecting said tank and said valve member whereby upward movement of said tank will force said valve member from its seat against the liquid pressure in said valve casing.

4. In combination with a wet-bulb temperature responsive instrument having a wick, a movable tank for containing a supply of liquid into which said wick dips, and means biasing said tank for movement in a direction to raise the liquid level on said wick, said tank being arranged so that its weight and the weight of the liquid it contains oppose said biasing means, whereby said tank may move under the influence of said biasing means to maintain substantially constant the liquid level on said wick as the quantity and weight of liquid in said tank decreases.

5. The invention set forth in claim 4 with the addition of means for supplying liquid to said tank, and a control device operated by tank movements for controlling the supply of liquid to the tank.

6. In combination, a stationary bracket, a water-tank movably supported from said bracket, said bracket being provided with means for supporting the bulb of a temperature-responsive instrument and with a stop for limiting movement of the tank, a wick associated with said bulb and dipping into liquid in the tank, and means biasing said tank for movement in a direction to raise the liquid level on said wick, said tank being arranged so that the weight of the liquid it contains opposes said biasing means.

7. The invention set forth in claim 6 with the addition of means for supplying liquid to said tank, and a control device operated by tank movements for controlling the supply of liquid to said tank.

In witness whereof, I have hereunto set my hand at Indianapolis, Indiana, this 7th day of October, A. D. one thousand nine hundred and twenty-seven.

ARTHUR E. KRICK.